UNITED STATES PATENT OFFICE.

HANS KUŽEL, OF HÖCHST-ON-THE-MAIN, GERMANY, ASSIGNOR TO THE FARBWERKE, VORMALS MEISTER, LUCIUS & BRÜNING, OF SAME PLACE.

NAPHTHOL TRISULFONIC-ACID MONAMID.

SPECIFICATION forming part of Letters Patent No. 511,898, dated January 2, 1894.

Application filed August 11, 1890. Serial No. 361,722. (No specimens.)

*To all whom it may concern:*

Be it known that I, HANS KUŽEL, a doctor of philosophy, and a subject of the Emperor of Germany, residing at Höchst-on-the-Main, in the Empire of Germany, have invented certain new and useful Improvements in the Production of Naphthol Trisulfonic-Acid Monamid; and I do hereby declare the following to be a full, clear, and exact description of the invention, such as will enable others skilled in the art to which it appertains to make and use the same.

My present invention relates to the production of naphthol trisulfonic-acid-monamid in the form of its salts.

In carrying out my invention I proceed from the naphthosulton disulfonic acid described in German Letters Patent, dated February 1, 1890, No. 56,058, recently published, or its salts, converting the same by treatment with concentrated caustic ammonia into a sulfamid

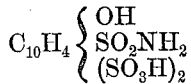

its ammonia salt or its ammonia sodium salt respectively.

To give an example: One hundred parts by weight of naphthosultondisulfonate of sodium are mixed, at ordinary temperature, with from two hundred to three hundred parts by weight of aqueous caustic ammonia of twenty per cent.; a quarter of an hour afterward the solution will have become clear and of light yellow color and the ammonia sodium salt of the naphthol trisulfonic acid monamid will have formed. When for the sodium salt is substituted another salt, i. e., for example the potassium salt, the ammonia-potassium salt is obtained. There may be equally well employed the calcium-magnesium salts, &c. There may also be employed alcoholic ammonia or ammonia gas. The ammonia sodium salt, by means of alcohol, is precipitated from its solution in the form of a citrine powder and may be obtained in a pure state by redissolving in water and precipitating by means of alcohol. If a concentrated aqueous solution of these mixed salts, obtained in the manner described, for example a solution of the ammonia-sodium salt, is acidulated with hydrochloric acid and left alone there crystallizes out, after a short time, the neutral sodium salt of the amid having the formula—

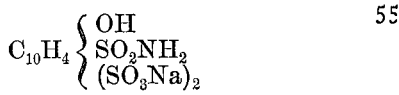

in white moss-like formations. The neutral sodium salt is of very easy solubility in water without at all coloring it. A cold aqueous solution of the same is not colored by the addition of ferric chlorid solution. When, however, the solution is boiled the ammonia escapes, a yellowish coloration appears and a ferric chlorid solution will give a blue tint, (reaction of the corresponding naphtholtrisulfonic acid) a proof that by boiling with water naphtholtrisulfonic acid has been partially regenerated. With fixed alkali or carbonates of sodium or potassium, or ammonia the regeneration proceeds rapidly and completely.

By the action of diazo bodies upon the naphtholtrisulfonic acid-monamid in presence of an alkali or acetate of sodium a coloring matter is formed.

The free acid has the formula—

The neutral sodium-ammonia salt has the formula—

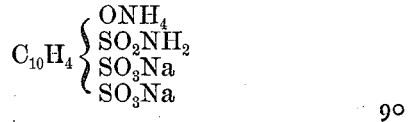

The neutral sodium salt has the formula—

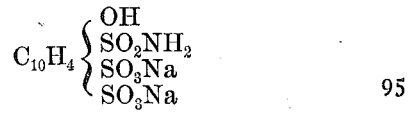

I am aware of the process of Bernthsen which, in one sense, is similar to mine it being a derivative of naphthosulton *i. e.* sulfonic acids of this body are converted by treatment with ammonia into sulfamide-sulfonic acid. These sulfonic acids however are not the same but different bodies. Bernthsen submitting his to the reaction of naphthosulton-mono-sulfonic acid, of the formula—

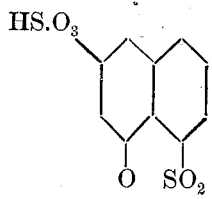

and I on the other hand submitting mine to a novel naphthosulton disulfonic acid of the formula—

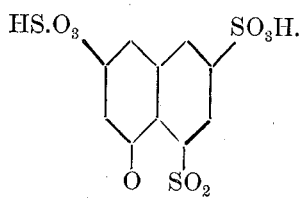

On account of the different raw material in my process I produce a novel body which is a naphthol trisulfonic acid-monamid quite different from the naphthol disulfonic acid-monamide obtained in Bernthsen's process.

Having thus described my invention and the manner in which the product is obtained, what I claim is—

1. The process for producing the salts of naphtholtrisulfonic acid-monamid by treating the herein described naphthosulton-disulfonic acid with ammonia, substantially as set forth.

2. As a new article of manufacture the salts of naphtholtrisulfonic acid-monamid derived from the naphthosultondisulfonic acid herein described which are soluble in water precipitated by alcohol and acids, the latter precipitating mosslike; ferric chlorid does not color the cold aqueous solution, but on removing the ammonia by boiling it produces the blue tint characteristic of the regenerated naphtholtrisulfonic acid.

In testimony whereof I affix my signature in presence of two witnesses.

HANS KUŽEL.

Witnesses:
RUDOLPH MANES,
HEINRICH HAHN.